March 30, 1965 E. H. GATZERT ETAL 3,176,080

NIGHT ANSWERING AND TRANSFER OF TRUNK CALLS

Filed Dec. 11, 1959 4 Sheets-Sheet 1

INVENTORS.
ERNEST H. GATZERT
GEORGE W. KILLIAN
BY
F. H. Henson
ATTORNEY

March 30, 1965 E. H. GATZERT ETAL 3,176,080

NIGHT ANSWERING AND TRANSFER OF TRUNK CALLS

Filed Dec. 11, 1959 4 Sheets-Sheet 2

March 30, 1965 E. H. GATZERT ETAL 3,176,080

NIGHT ANSWERING AND TRANSFER OF TRUNK CALLS

Filed Dec. 11, 1959 4 Sheets-Sheet 3

United States Patent Office 3,176,080
Patented Mar. 30, 1965

3,176,080
NIGHT ANSWERING AND TRANSFER OF TRUNK CALLS

Ernest H. Gatzert, El Segundo, Calif., and George W. Killian, Rochester, N.Y., assignors to General Dynamics Corporation, Rochester, N.Y., a corporation of Delaware Filed Dec. 11, 1959, Ser. No. 858,961
12 Claims. (Cl. 179—27)

This invention relates in general to automatic telephone systems and, more particularly, to automatic private branch exchange telephone systems.

Although the invention herein described is suitable for more general application, it is particularly adapted for use in private branch exchanges. In private branch exchanges it is customary to provide trunk lines between the PBX and a central office in order to facilitate calls therebetween. It is the usual practice in such systems to permit subscribers at the PBX to dial a predetermined number to seize an idle trunk line for making a call to the central office. However, calls from the central office to the PBX are customarily directed to an operator who extends the call to the required PBX station. In large PBX's the services of one or more full-time operators are required to complete the calls as they are received. In smaller PBX's the operator often serves as a receptionist or typist. Such arrangements have served admirably for many years. However, they do present the disadvantage of requiring a night operator if calls are to be answered during other than usual business hours. Various procedures have been adopted to handle night service without requiring the presence of a night operator. For example, if a guard is required at a stationary point, he frequently serves as night operator; or those who work beyond the operator's hours may make it a point to do their work in the vicinity of the switchboard and handle calls as they are received; or when the operator goes off duty, she may connect certain trunk lines to predetermine PBX stations and incoming calls on each specific trunk line are then directed to different predetermined PBX extensions. Any of these systems may cause a certain amount of confusion and running about when an incoming call is received at night, as the party answering the call may not be the one for whom it was intended.

It is the general object of this invention to provide a new and improved automatic PBX telephone system.

It is a more particular object of this invention to provide a new and improved means for answering calls at a PBX when an operator is not on duty.

Another object is to provide means for any PBX station to answer an incoming call and for said answering station to selectively transfer the incoming call to any other PBX station.

In accordance with the present invention, a common audible signal is sounded whenever an incoming call is received at the PBX and no operator is in duty. In response to the signal, a designated person, or any other person, may use any telephone to dial the number which is usually used to access outside trunk lines and thereby answer the incoming call. When the answering party determines for whom the call was intended, he may place the trunk in hold and seize a local link by dialing a predetermined code. In response to further dailing, the answering party, at a first station, may extend a call to a second PBX station. If the person at the second PBX station is willing to accept the trunk call, a connection between the trunk party and the person at the second PBX station may be completed in response to the disconnect of the person at the first PBX station. Thereafter the answering equipment is free for use in answering and transferring any other incoming calls. Should the person at the second PBX station be unwilling to accept the trunk call, the answering party at the first PBX station may, by a slow hookswitch flash after the second PBX station is on-hook, reestablish a connection to the trunk and later extend the connection to any other PBX station.

In addition to the above, a feature is provided to audibly indicate when a second call or successive calls are awaiting answer before the first call has been disposed of by transfer. Another feature provides for uninterrupted service as the operator goes on and off duty.

Further objects and advantages will become apparent as the following description proceeds, and features of novelty which characterize the invention will be pointed out in particularity in the claims annexed to and forming a part of this specification.

For a better understanding of the invention, reference may be had to the accompanying drawings which comprise 5 figures on 4 sheets. Sheets 2–4 of the drawings should be arranged in successive order from left to right to show the invention.

It is to be understood that only the details of the circuts neceessary for a complete understanding of this invention have been shown. For example, the details of circuits such as line circuits, line finders, selectors, connectors, and combination trunks, which are well-known in the art, have been omitted. In addition, the power supply, which in telephone systems is conventionally approximately 50 volts D.C., has not been shown and all terminals which should be connected to the positive side of the D.C. power supply are designated as (+), hereinafter referred to as "ground"; while all terminals which should be connected to the negative side of the D.C. power supply are designated as (—), hereinafter referred to as "battery," in accordance with accepted telephone switching terminology.

Figure 1:
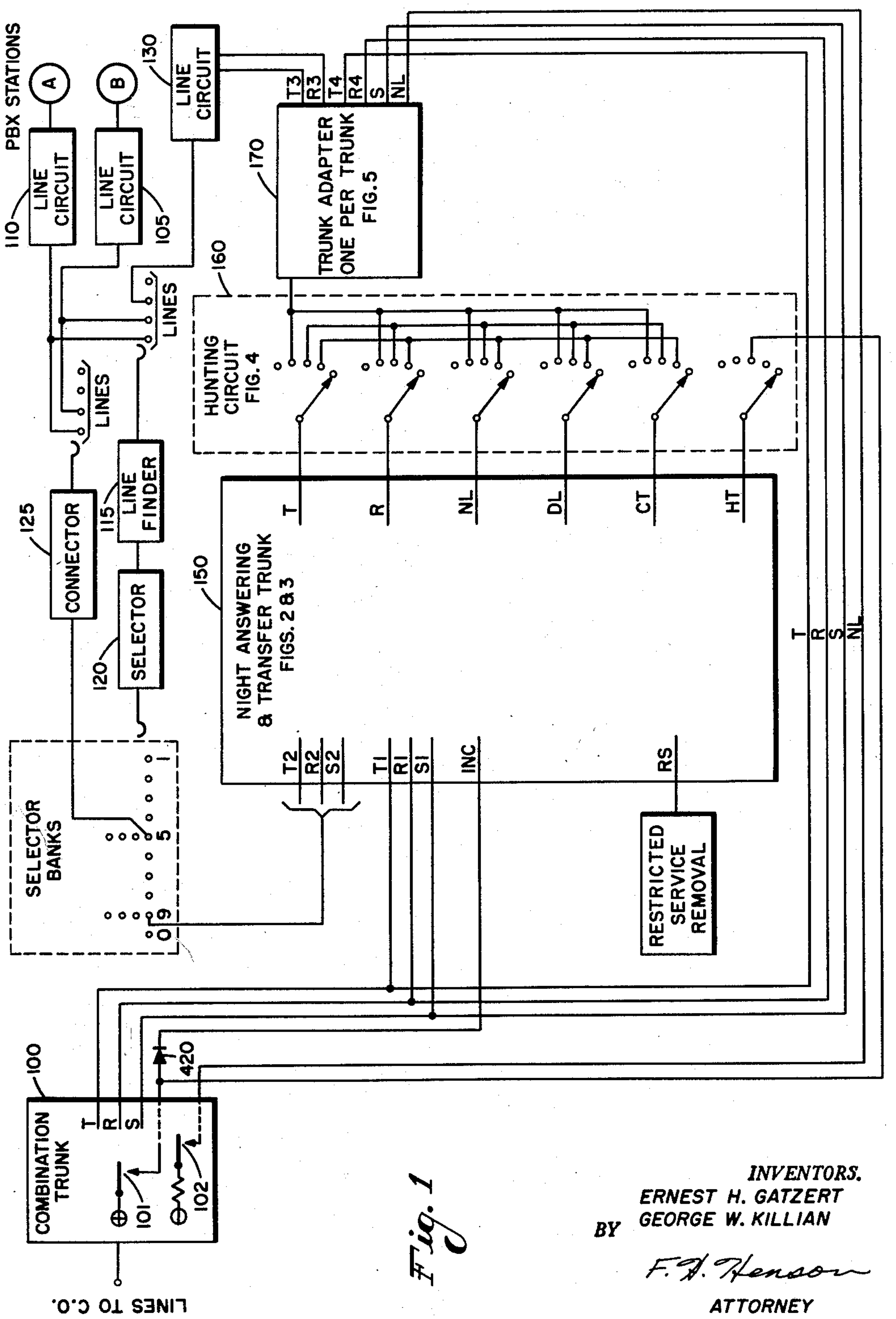
FIGURE 1 shows a block diagram of a telephone system employing this invention.
Figure 2:
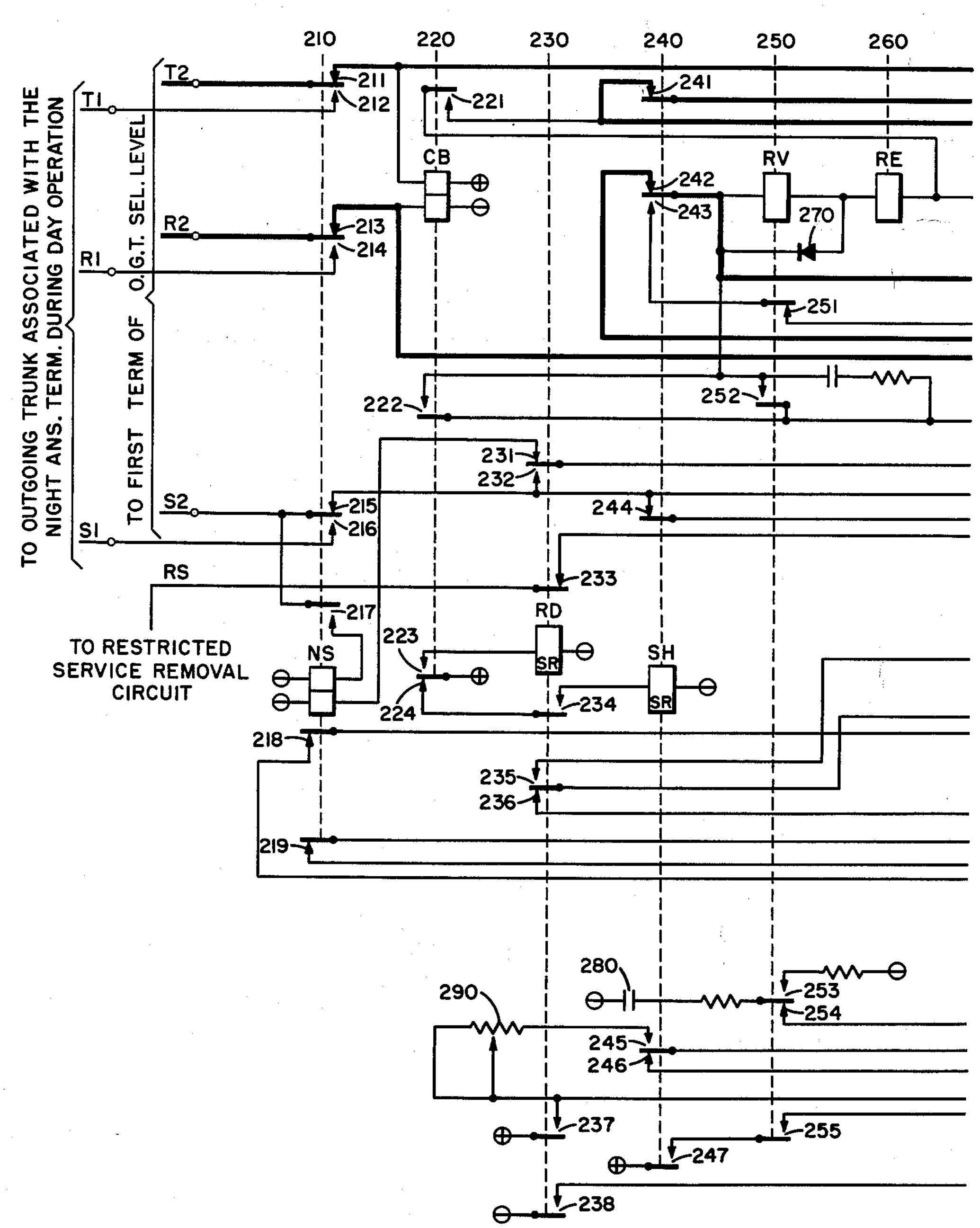
FIGURES 2 and 3 show the night answering and transfer trunk.
Figure 3:
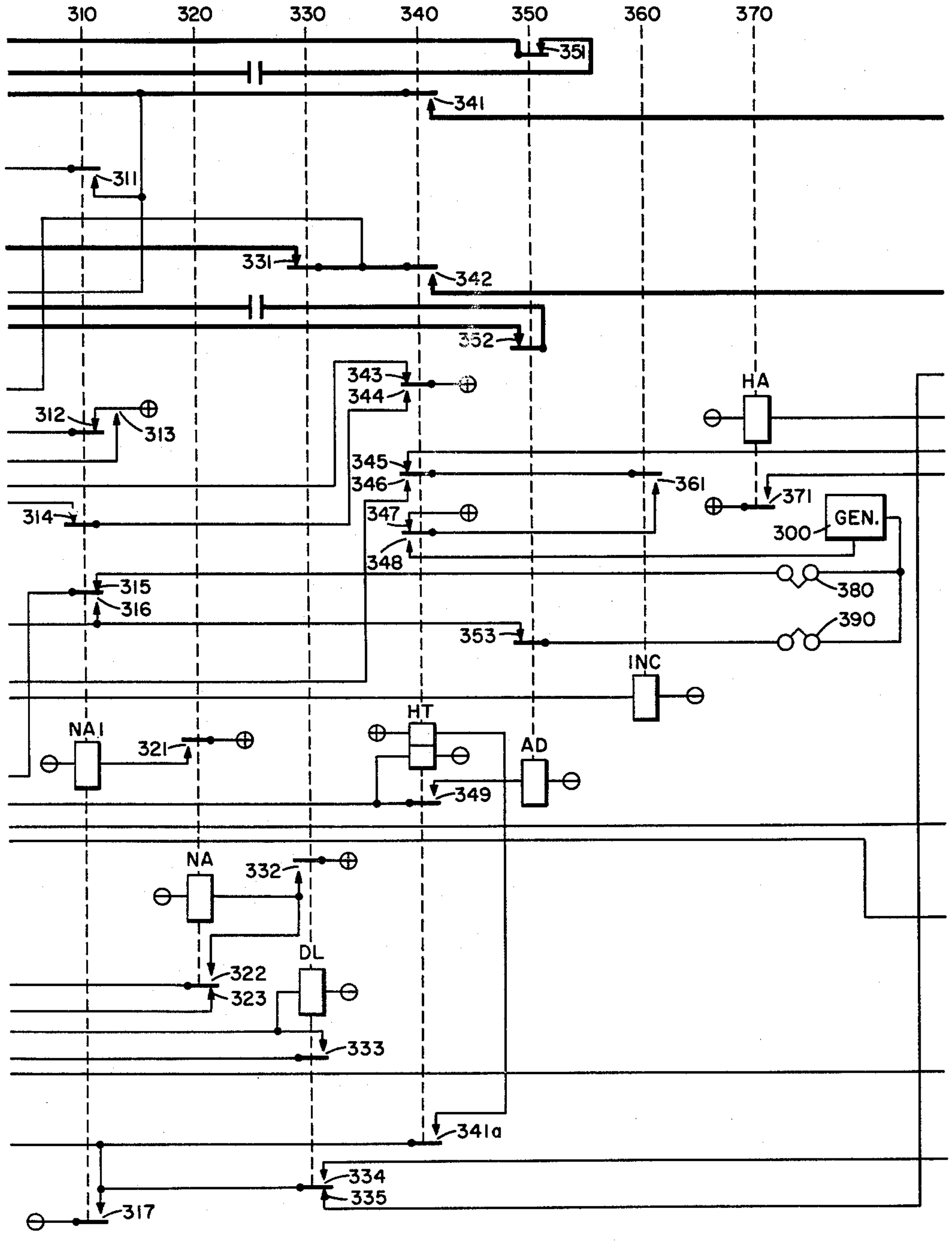
Figures 4, 5:
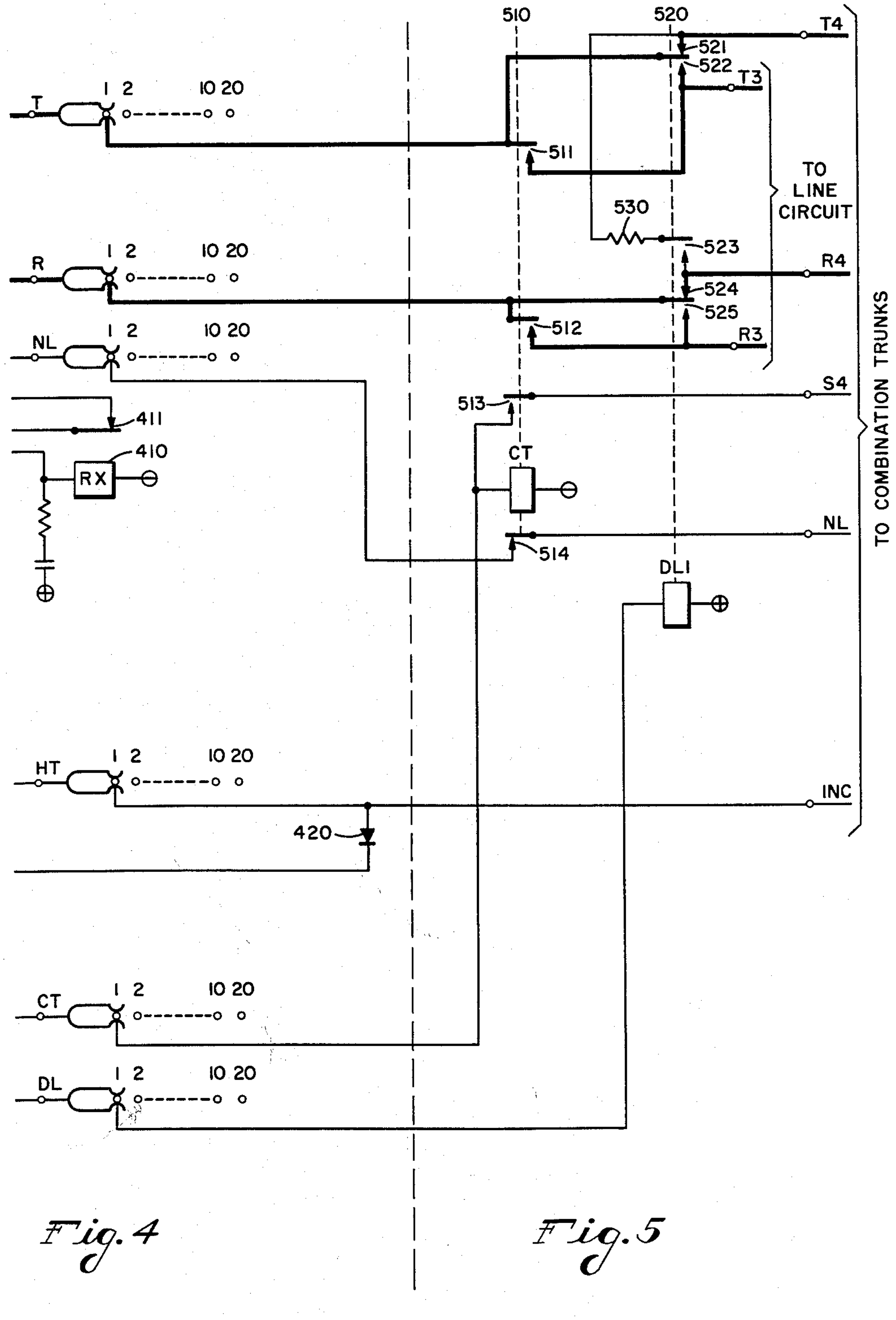
FIGURE 4 shows the hunting circuit.
FIGURE 5 shows the trunk adapter circuit.

It is believed that the operation of the system can best be understood by tracing the extension of a call through this system. For this purpose, reference may be had to FIGURE 1 which illustrates, in block diagram form, some of the essential circuits which might be used in a PBX employing the present invention. A call which is incoming to the PBX will be received at combination trunk 100 and when an operator is on duty she will be signaled thereby in any well-known manner. A call from the PBX to the central office may be made, for example, by a subscriber at station A raising his handset to seize the associated line circuit 110 and cause line finder 115 and selector 120 to be associated with his line in a well-known manner. Then in response to directive pulses, the selector 120 may be stepped to the trunk level used to effect the seizure of an idle combination trunk, usually level 9. While it will be observed that the wiring from the first terminal of the 9th level of the selector bank is connected directly to the night answering and trunk transfer circuit 150, it should be understood that all other terminals in this level are wired directly to individual combination trunks similar to combination trunk 100. Also, when the night answering and trunk transfer circuit 150 is not in use, that is, when an operator is on duty, the terminals designated T2, R2 and S2 are connected, respectively, to the terminals designated T1, R1 and S1 through relay contacts thereby completing a connection from the first terminal of the 9th level of the selector bank to combination trunk 100. However, it will be shown that when an operator is not on duty that the first terminals of the 9th level of the selector bank is marked as busy by holding a ground on the sleeve terminal to cause selector 120 to hunt in a well-known manner past the first terminal when no incoming calls are awaiting answer and that T2, R2 and S2 are not connected to T1, R1 and S1. Thus, when an operator is not on duty, a PBX subscriber may still make a call to the central office by dialing selector 120 to the 9th level.

When an operator is not on duty, the night answering and trunk transfer circuit 150 will be put into operation and the connections between leads T2, R2 and S2 and T1, R1 and S1 will be broken by contacts 212, 214 and 216, respectively. As an incoming call is received, the combination trunk 100 and contacts 101 will operate to place a ground through a diode 420 to the INC lead to the night answering and trunk transfer circuit 150. In response to this ground, a hunting circuit 160 will hunt for the trunk with the incoming call. The hunting is accomplished through the bottom bank of the rotary switch and employs a conventional hunting circuit which searches for the terminal with ground from contacts 101 of the combination trunk 100. When the hunting circuit 160 has associated the night answering and trunk transfer circuit 150 with the proper combination trunk, an audible signal will be sounded and the ground marking on the sleeve lead of the first terminal of the 9th level will be removed. Any person hearing the incoming signal may answer the call from any phone by dialing a predetermined code, usually 9, and in response thereto, seize the night answering and trunk transfer circuit 150, thereby completing a transmission connection between the answering station, such as station A, and the combination trunk 100. After the person at station A who answered the call has determined to whom the trunk party desires to talk, he will request that the trunk party wait. He may then dial a predetermined digit, usually 0, to place the combination trunk 100 in hold, thereby breaking the transmission path and causing the night answering and trunk transfer circuit 150 to seize line circuit 130, which is associated with trunk adapter 170. In response to the seizure of line circuit 130, a line finder 115 and selector 120 link will be associated with this line circuit and be controlled by the party at the first answering station A. In response to a directive pulse, selector 120 may be made to seize connector 125 and further pulses can cause the seizure of line circuit 105 and in response thereto signal station B. When station B answers, a conversation path is completed between stations A and B, which, it should be noted, excludes the trunk party. Should the person at station B be willing to accept the trunk call, the person at station A may disconnect, which causes trunk adapter 170 to cut through to the combination trunk using the following circuits: line circuit 105, connector 125, selector 120, line finder 115, line circuit 130, trunk adapter 170 and combination trunk 100. The night answer and trunk transfer circuit 150 and the hunting circuit 170 are free for use in answering any other incoming calls. Should it have happened that station B was busy or did not desire to accept the call, the subscriber at station A may reestablish a connection to the combination trunk 100 by a slow hookswitch flash after, or while, station B is on-hook. Additional transfers may be attempted by station A as may be required. No further transfers are possible after the call has been transferred to a second PBX station.

*Detailed description*

When an operator is on duty, relay 210 is held operated from ground at contacts 312, closed contacts 231 and the lower winding of relay 210 to battery. The battery connection to the lower winding of relay 210 is controlled by the operator and may be disconnected by her with means not shown. Thus, battery may be connected to this terminal when an operator is on duty and battery may be removed from this terminal when the operator goes off duty. The other winding of relay 210 and contacts 217 provide a holding circuit for this relay to prevent the release of relay 210 if the first choice combination trunk is busy and a call in progress would be interrupted by the release of relay 210 when the operator removes battery from the lower winding. Consequently, with an operator on duty and with relay 210 operated, the night answering and trunk transfer circuit cannot be seized as contacts 211, 213 and 215 hold the circuit to relay 220 open.

When the operator goes off duty and relay 210 is released by the removal of battery from the lower winding of relay 210, an incoming call to the PBX will be indicated by the combination trunk placing a ground from contacts 101 on the INC lead which is conducted through diode 420 and contacts 218 to operate the incoming relay 360. In addition, resistance battery from contact 102 is placed on the NL lead. It will be noted that the night answering and trunk transfer circuit is marked as busy by ground from contacts 343 through contacts 244 and 215 being placed on the S2 lead.

The operation of incoming relay 360 operates the hunt assist relay 370 from battery through the coil of relay 370, rotary switch interrupter contacts 411, contacts 345 and operated contacts 361 to ground at contacts 347. The operation of hunt assist relay 370 closes contacts 371 to close an obvious circuit to the rotary switch stepping magnet 410 which is thereby operated and opens the interrupter contacts 411 to release relay 370 which in turn opens contacts 371 which in their turn open the circuit to the rotary switch magnet 410 which causes the wipers of the indirect drive rotary switch to take one step. The release of the rotary switch closes interrupter contacts 411 thereby closing the circuit to relay 370. The interaction between relay 370, rotary switch 410 and the rotary switch interrupter contacts 411 is repeated and the rotary switch wipers take another step. This hunting operation will continue until the wiper of the rotary switch designated HT comes in contact with the terminal connected to the INC lead from the combination trunk which is holding ground thereon in response to the incoming call. When the HT wiper does contact the ground on the INC lead, it will be conducted through released contacts 219 to operate hunt relay 340. In response to the operation of relay 340, contacts 345 open to prevent any further operation of relay 370 thereby preventing any additional stepping of the rotary switch. The opening of contacts 343 removes the aforementioned ground from the S2 lead thereby permitting access to the night answering and trunk transfer circuit. The closure of contacts 344 places a ground to the restricted service removal circuit, through contacts 314 and 233, which is effective in systems which provide for restricted service of certain PBX stations for removing said restrictions for sufficient time to permit the incoming call to be answered from any station irrespective of restricted service marking. It should be noted that no outside calls can be made unless the incoming call is answered and that after the incoming call is answered, the restriction is restored on all restricted lines. The closure of contacts 349 closes a circuit permitting the operation of audible relay 350 from the same ground as that which originally operated relay 340. The closure of contacts 348 and 346 completes a circuit to sound audible ringer 380 as follows: from the left terminal of ringer 380, closed contacts 315, 236, 346, 361 and 348, through ringing generator power supply 300 to the right-hand terminal of the ringer 380. Contacts 341*a* close a circuit from ground through the upper winding of relay 340 through contacts 341*a*, 335, the NL wiper and terminals of the rotary switch through contacts 514 to the NL lead and resistance battery at contacts 102 in the combination trunk 100. This serves as a holding circuit to hold relay 340.

As previously mentioned, any person at the PBX may pick up any phone and dial the central office trunk level, usually 9, after hearing the audible signal 380, and thereby answer the incoming call. The answering and seizure operation will close a loop across terminals T2 and R2 to operate calling bridge relay 220 through closed contacts 211 and 213. The operation of relay 220 closes contacts 223 to operate relay 230 over an obvious circuit. The closure of contacts 221 and 222 serves to close a loop to the combination trunk at terminals T4 and R4. The loop circuit is as follows: from T4 through closed contacts 521 terminal and tip wiper of the rotary switch contacts 341, 221, repeat coil 260, diode 270, contacts 222, 243, the R wiper and terminal of the rotary switch and contacts 524 to R4. Relay 250, which is in parallel with diode 270, does not operate due to the shunting effect of diode 270. The closure of this loop causes the combination trunk to remove ground from the INC lead. The operation of relay 230 provided another alternate circuit to hold relay 340 operated by providing battery from contacts 238 through contacts 341*a* to the ground-connected upper winding of relay 340. The removal of ground from the INC lead releases relays 360 and 350. The operation of relay 230 opened contacts 236 to open the previously described circuit to audible ringer 380 thereby ending the incoming call audible signal. The closure of contacts 232 serves to place ground from contacts 312 on the S2 lead through contacts 215 to hold the preceeding selector 120 and perform other functions well known in the telephone switching art. Operation of relay 230 opened contacts 233 to cause the restricted service removal circuit to re-restrict marked lines. A transmission circuit between the answering PBX station and the trunk party is now completed over a portion of the lines which are drawn heavy to mark the transmission circuits. That is, the transmission path is from T2, contacts 211, 351, a transmission capacitor, contacts 241, 341, the T wiper of the rotary switch and T4 to the combination trunk; R4 contacts 524, the R wiper of the rotary switch, contacts 342, 331, 242, a transmission capacitor, contacts 352 and 213 to R2. The relays now operated are: hunt relay 340, calling bridge relay 220 and release delay relay 230. It should be noted that relays 230 and 240 are of the slow release type and therefore will remain operated even when open circuited for brief periods.

After the first answering PBX station determines with whom the trunk party desires to talk, the PBX party will request that the trunk party wait while the desired party is called. The first answering PBX party then dials zero to place the trunk in hold and dials other digits to signal the desired PBX station. Dialing the digit zero causes relay 220 to pulse. The first time relay 220 releases, contacts 224 complete an obvious circuit through contacts 234 to shunt relay 240 which operates. Relay 240 provides an alternate holding loop to the combination trunk which is as follows: from T4, contacts 521, rotary switch terminal and T wiper contacts 341, 251, 243, 331 and 342, the R wiper and rotary switch terminal and contacts 524 to R4. The transmission circuit is broken at contacts 241 and 242 of relay 240.

During the time that relay 240 is operated, the following circuit is closed from ground at contacts 237 through an adjustable resistor 290, contacts 245, 323, and 254 through a fixed resistor to capacitor 280 to battery to charge capacitor 280. The greater the digit that is dialed, the longer relay 240 will be held operated and the greater the ultimate charge on capacitor 280. At the conclusion of the dialing of the digit, the shunt relay 240 will release. At this time the energy stored by capacitor 280 will serve to energize dial relay 330 as follows: from battery through relay 330, closed contacts 246, 323, and 254 to the positively charged terminal of capacitor 280. The dial relay 330, which is thereby operated, closes contacts 333 thereby closing an alternate circuit so that ground at contacts 237 will hold relay 330 operated. The operation of relay 330 closes an obvious circuit through contacts 332 to operate relay 320 and relay 320 closes contacts 321 to provide another obvious circuit to operate relay 310. The operation of relay 310 closes contacts 317, which provides a battery through operated contacts 334, the DL wiper and terminals of the rotary switch to operate the dial relay 520 of the trunk adapter circuit. The operation of relay 520 closes an alternate loop to hold the combination trunk. The loop is from T4 through resistor 530 and operated contacts 523 to R4.

The loop which had previously been holding the combination trunk is now effective to close a loop across T3 and R3 thereby seizing a line circuit and causing a linefinder selector link to be associated with the night answering and trunk transfer circuit. The loop to the line circuit is from T3 through contacts, 522, the T wiper of the rotary switch, contacts 341, 221, retard coil 260, diode 270, contacts 222, 342, the R wiper of the rotary switch and contacts 525 to R3. The relays now operated are hunt relay 340, calling bridge relay 220, release delay relay 230, dial relay 330, and slave relays 320 and 310 as well as relay 520.

As the first answering party who controls relay 220 dials to extend the call, relay 220 pulses and relay 240 operates as previously described. The operation of relay 240 alters the loop to the local switch train as follows: from T3, contacts 522, the T wiper of the rotary switch, contacts 341, 251, 243, pulsing contacts 222, contacts 342, the R wiper of the rotary switch and contacts 523 to R3. The local switch train is pulsed and the desired party is signaled. Of course, relay 240 releases at the end of each digit. When the desired party, hereinafter referred to as the second party, answers, the first and second party may talk over the transmission circuit which is indicated by heavy lines in the drawings.

The first party may inform the second party that a trunk call has been received for the second party. Either the second party will accept or refuse to accept the trunk call. The night answering and trunk transfer circuit can distinguish which is desired by monitoring the loop to the second party and detecting the presence or absence of reverse battery supervision. If there is reverse battery supervision from the second party and the first party disconnects, then the call from the trunk party will be cut through to the second party when the first party disconnects. While if the second party does not want to accept the call, he may disconnect before the first party thereby removing the reverse battery supervision. Then, when the first party flashes his hookswitch, he will be reconnected to the trunk and can inform the trunk party that the desired second party is not available. Other extensions of the trunk call may be attempted by the first party until finally a successful extension is completed. It is the reverse relay 250 which serves to detect the reverse battery supervision from the second party.

Should a second incoming call be received at the PBX before the first incoming call is satisfactorily transferred, the second call cannot be answered. However, a separate and distinct audible alarm 390 is provided to indicate the awaiting call. Thus, if a second call is received, an INC lead will be grounded and the ground will pass through diode 420 and contacts 218 to operate incoming relay 360. Since relay 230 is operated, the following circuit will be closed to sound ringer 390: from left terminal of ringer 390, contacts 353, 235, 346, 361, 348, the ringing generator power supply 300 to the right-hand terminal of ringer 390.

Or, as will be shown, relay 230 may release at a certain stage of the operation and, at that time, relay 310 will be operated. Under these conditions, if relay 300 operates, ringer 390 may be operated over the following circuit: from left-hand terminal or ringer 390, contacts 353, 316, 236, 346, 361 and 348 to the ringing generator power supply 300 to the right-hand terminal of ringer 390.

The possibility of the second party accepting the trunk call will now be discussed.

*Second party desires to accept trunk call*

Prior to the time that the second party answers the call extended to his line by the first party, the following relays are operated: 340, 220, 230, 330, 320, 310, and 520. When the second party answers, reverse battery supervision is returned in a well-known manner by connector 125 such that the current flow, from plus to minus, within the night answering and trunk transfer circuit is from R3 to T3 rather than from T3 to R3, as it had been. With the opposite direction of flow of current, the diode 270 is no longer effective to shunt reverse relay 250 and therefore relay 250 operates. The circuit is from ground in the connector circuit through connecting circuits to R3, contacts 525, the R wiper of the rotary switch, contacts 342, 222, the coil of reverse relay 250, retard coil 260, contacts 311 and/or 221 in parallel, contacts 341, the T wiper of the rotary switch and contacts 522 to T3. The operation of relay 250 closes contacts 252 which shunt contacts 222 thereby holding the loop to the local switch train when the first answering party disconnects. In addition, contacts 253 close a circuit to discharge capacitor 280 which had been maintained charged from ground at contacts 332 through contacts 322 and 254 to capacitor 280.

The first answering party may now disconnect which releases relay 220 and operates relay 240 as previously described. The operation of relay 240 with reverse relay 250 operated completes a circuit from ground at contacts 247 through contacts 255 and the CT wiper of the rotary switch to operate cutthrough relay 510. The cutthrough relay 510 closes contacts 513 to hold this relay from a ground on the S4 lead furnished by the combination trunk. The release of relay 220 releases relay 230. The release of relay 230 causes the release of all other relays in the night answering and trunk transfer circuit as they were either held by release delay relay 230 or by relays which were ultimately controlled by relay 230. Relay 520 is released by the release of relay 330.

The trunk party and the second party may now talk using part of the trunk adapter circuit. The connection from T4 in the trunk circuit being through closed contacts 521, operated contacts 511 to T3 to the second answering party. The connection from R4 to R3 is similar and passes through operated contacts 512.

*Second party does not desire to accept the trunk call*

Prior to the time that the second party answers the call extended to his line by the first party, the following relays are operated: 340, 220, 230, 330, 320, 310, and 520. As described in the section where the second party did accept the call, the reverse relay 250 will be operated at any time the second answering party is offhook. If the second answering party should decline to accept the trunk call or if the second answering line is busy, the first answering party may reestablish a connection with the trunk party by slowly flashing his hookswitch when the reverse relay 250 is not operated. That is, the first answering party must perform his hookswitch flash after the second answering party has disconnected; or in the case of a busy, at any time, as in this case relay 250 will not have operated at all.

It should be noted that with relay 250 released, capacitor 280 is maintained in a charged condition from ground at contacts 332 through contacts 322 and 254, a fixed resistor, and capacitor 280 to battery. Furthermore, it should now be observed that operated contacts 313 of relay 310 serve to provide a ground on the S2 lead through contacts 215 and that therefore the holding of the preceding circuits is independent of relay 230.

When the first answering party depresses his hookswitch, relay 220 releases and relay 240 operates as previously described. After the slow release time of relay

230 has elapsed, it will release as it was open-circuited by the opening of contacts 223 of relay 220. As a consequence, relay 330 will release as contacts 237 open. However, although contacts 332 open, relay 320 will not release instantaneously as the energy stored by capacitor 280 serves to hold it operated. Furthermore, the design of the circuit and the value of capacitor 280 are selected to hold relay 320 operated for the duration of a slow hookswitch flash and therefore relay 320 does not release. At the end of the hookswitch flash, relays 220 and 230 reoperate. Relay 240 may or may not have released during the hookswitch flash but it will release at the end of its slow release time after the hookswitch flash. During the hookswitch flash and after dial relay 330 releases, the hunt relay 340 is held operated from battery at contacts 317 of relay 310 through contacts **341*a* to the upper winding of hunt relay 340. After the hookswitch flash, relay 320 will release when capacitor 280 no longer has sufficient energy left to hold it operated. In turn, relay 310 will release. Thus, in summary, the relays operated at the conclusion of the hookswitch flash are 340, 220, and 230**. It will be recalled that these are identically the same relays which were operated when the first answering party first established a transmission circuit to the combination trunk by dialing 9. Therefore, the circuit has been restored to that condition and the first answering party may again converse with the trunk party and determine what other action he should take.

While there has been shown and described what is considered at present to be the preferred embodiment of the invention, modifications thereto will readily occur to those skilled in the art. It is not desired, therefore, that the invention be limited to the embodiments shown and described, and it is intended to cover in the appended claims all such modifications as fall within the true spirit and scope of the invention.

What is claimed is:

1. In a telephone system, a central office, a PBX with a plurality of stations each equipped with control signaling means consisting of a dial and a hookswitch, a plurality of trunk lines connecting said PBX with said central office, said PBX stations comprising first and second groups which are and are not, respectively, restricted from making outgoing calls from said PBX, subscriber lines connected to said central office, switching circuits in said central office for completing transmission connections between said subscriber lines and said trunk lines, common indicator means at said PBX for indicating an incoming call on any one of said trunk lines, means for any one of said PBX stations to be connected with the particular trunk line having an incoming call in response to the dialing of a predetermined code at said PBX station, and means subsequently responsive to additional control signals from said one of said PBX stations for coupling another one of said PBX stations to said particular trunk line.

2. In a telephone system, a central office, a PBX having a plurality of stations comprising first and second groups which are and are not, respectively, restricted from making outgoing calls from said PBX, each PBX station having individual extension numbers and each equipped with control signaling means consisting of a dial and a hookswitch, a plurality of trunk lines connecting said central office and said PBX, a plurality of subscriber lines in said central office, switching circuits in said central office adapted to complete connections between said subscribers' lines and any one of said trunk lines in response to subscriber controlled directive pulses, common signaling means at said PBX for indicating an incoming call on any one of said trunk lines in response to the seizure of one of said trunk lines from said central office, means for connecting a first PBX station from either of said first and second groups with the particular trunk line having an incoming call in response to the dialing of a predetermined code at the first PBX station, and transfer means adapted to transfer the incoming PBX trunk line call from said first PBX station to another PBX station in response to the dialing of a predetermined code plus the individual extension number indicative of the other PBX station at the first station.

3. The system described in claim 2 wherein means are included for releasing said transfer circuit after the incoming trunk line is coupled to said other PBX station.

4. In a telephone system, a dial central office and a dial PBX, trunk lines connecting said dial PBX to said dial central office, subscriber lines in said central office, extension lines at said PBX each equipped with control signaling means consisting of a dial and a hookswitch, said PBX lines comprising first and second groups which are and are not, respectively, restricted from making outgoing calls from said PBX, switching circuits for completing connections between said subscribers' lines and said trunk lines, means responsive to the dialing of a predetermined code from one of said PBX lines in said unrestricted group for seizing an idle one of said trunk lines when there is no incoming call waiting to be answered on one of said trunk lines, and means responsive to the dialing of the same predetermined code from any one of said PBX lines for answering an incoming call on one of said trunk lines when there is a call waiting to be answered on one of said trunk lines.

5. The system described in claim 4 and including transfer means at the PBX for transferring the incoming call from the answering extension to another extension responsive to the dialing of a predetermined code plus the extension number of the desired extension at the answering extension.

6. The system described in claim 5 wherein said transfer means includes means responsive to a hookswitch flash at the first answering extension for reconnecting said first answering extension to said trunk line when said desired extension is onhook.

7. In a telephone system, a central office, an automatic PBX having a plurality of stations, said stations comprising two groups which are and are not, respectively, restricted from making calls to said central office, each of said stations having individual extension numbers and each equipped with control signaling means consisting of a dial and a hookswitch, a plurality of trunk lines connecting said central office and said PBX, switching circuits in said central office responsive to subscriber controlled directive pulses for seizing one of said trunk lines to extend a call to said PBX, common signaling means at said PBX for indicating an incoming call on one of said trunk lines responsive to the seizure of one of said trunk lines by said switching circuits, an answering circuit at said PBX for completing a transmission connection between an answering PBX station from either of said two groups and said seized trunk line in response to predetermined signals from said answering station only after said common signaling means has indicated an incoming call on one of said trunk lines, and transfer means included in said answering circuit responsive to control signals from said answering station for transferring the transmission connection from said seized trunk line to another PBX station when said answering station disconnects.

8. The system as described in claim 7 wherein said transfer means includes means responsive to said control signals for opening the transmission connection between said answering PBX station and said seized trunk line whereby an exclusive transmission connection may be completed from the answering PBX station to the other PBX station.

9. In a telephone system, a central office, an automatic PBX, a plurality of two-way trunk lines and circuits connecting said central office and said PBX, switching circuits in said central office responsive to subscriber controlled directive pulses for seizing an idle one of said trunk lines for extending a call to said PBX, common signaling means at said PBX for indicating an incoming call on one of said trunk lines responsive to the seizure thereof by said switching circuits in said central office, a plurality of PBX extensions each of which is equipped with control signaling means consisting of a dial and a hookswitch, said PBX extensions comprising first and second groups which are and are not, respectively, restricted from making calls to said central office, means at said PBX responsive to directive signals from one of said PBX extensions in said unrestricted group for seizing an idle one of said trunk lines to extend a call to said central office when there is no incoming call waiting to be answered, and means at said PBX responsive to the same control signals from any one of said PBX extensions for answering an incoming call on one of said trunk lines when there is a call waiting to be answered.

10. The combination as set forth in claim 9 wherein said answering circuit includes means responsive to additional control signals from said one of said PBX extensions for completing a transmission connection between said one PBX extension and a second PBX extension, and coupling means for completing a transmission connection between said second PBX extension and said one trunk line in response to the disconnect of said one of said PBX extensions.

11. The combination as set forth in claim 10 wherein said answering circuit includes means for reestablishing a connection between said first PBX extension and said one trunk line in response to a hookswitch flash at said first PBX extension when said second PBX extension is onhook.

12. The combination as set forth in claim 10 wherein said answering circuit is not included in the connection between said second PBX extension and said one trunk line.

References Cited by the Examiner

UNITED STATES PATENTS

| | | | |
|---|---|---|---|
| 2,020,816 | 11/35 | Voss et al. | 179—18 |
| 2,358,185 | 9/44 | Pearce et al. | 179—18 |
| 2,501,546 | 3/50 | Stehlik | 179—26 |
| 2,788,393 | 4/57 | Armstrong | 179—27 |
| 2,855,463 | 10/58 | Abbott et al. | 179—27 |
| 3,008,010 | 11/61 | LeQueau | 197—27 |

ROBERT H. ROSE, *Primary Examiner.*

L. MILLER ANDRUS, *Examiner.*